US011417195B2

(12) United States Patent
Rao et al.

(10) Patent No.: US 11,417,195 B2
(45) Date of Patent: Aug. 16, 2022

(54) LOCATION-AWARE PROVISIONING SYSTEM FOR FIRE ALARM SYSTEM AND METHOD THEREFOR

(71) Applicant: Tyco Fire & Security GmbH, Neuhausen am Rheinfall (CH)

(72) Inventors: Manjuprakash Rama Rao, Bangalore (IN); Surajit Borah, Bangalore (IN)

(73) Assignee: JOHNSON CONTROLS FIRE PROTECTION LP, Boca Raton, FL (US)

( * ) Notice: Subject to any disclaimer, the term of this patent is extended or adjusted under 35 U.S.C. 154(b) by 0 days.

(21) Appl. No.: 16/477,663

(22) PCT Filed: Jan. 17, 2017

(86) PCT No.: PCT/IB2017/050249
§ 371 (c)(1),
(2) Date: Jul. 12, 2019

(87) PCT Pub. No.: WO2018/134640
PCT Pub. Date: Jul. 26, 2018

(65) Prior Publication Data
US 2019/0362618 A1 Nov. 28, 2019

(51) Int. Cl.
*G08B 25/00* (2006.01)
*H04W 4/33* (2018.01)
(Continued)

(52) U.S. Cl.
CPC ......... *G08B 25/003* (2013.01); *G06F 3/0488* (2013.01); *G06F 3/04817* (2013.01);
(Continued)

(58) Field of Classification Search
CPC ... G06F 3/04817; G06F 3/0488; G08B 17/00; G08B 25/003; G08B 25/016; G08B 25/10; H04W 4/029; H04W 4/33; H04W 64/003
See application file for complete search history.

(56) References Cited

U.S. PATENT DOCUMENTS 10,382,358 B1 * 8/2019 Jain ..................... H04L 67/1089
2003/0005100 A1 * 1/2003 Barnard ............ H04L 29/12113
709/223
(Continued)

FOREIGN PATENT DOCUMENTS

EP          0 965 965       12/1999
WO    WO 2012045998        4/2012
WO    WO 2013135764        9/2013

OTHER PUBLICATIONS

International Search Report and Written Opinion of the International Searching Authority, dated Jan. 4, 2018, from International Application No. PCT/IB2017/050249, filed on Jan. 17, 2017. 18 pages.

(Continued)

Primary Examiner — Omeed Alizada
(74) Attorney, Agent, or Firm — ArentFox Schiff LLP

(57) ABSTRACT

A fire alarm system design layout map is used in conjunction with a mobile computing device, an indoor tracking system and a connected services system to automate the process of determining the intended slave address for each slave device, assigning the slave address to the slave device, and verifying the assignment of the slave address to the slave device. The mobile computing device sends the location of a slave device to the connected services system, which maps the location to its corresponding position on the layout map and returns the intended slave address for that slave device. The slave address is assigned wirelessly to the slave device.

(Continued)

The assignment of the slave address to the slave device is then verified by the connected services system.

27 Claims, 10 Drawing Sheets

(51) Int. Cl.
| | |
|---|---|
| H04W 4/029 | (2018.01) |
| G06F 3/04817 | (2022.01) |
| G06F 3/0488 | (2022.01) |
| G08B 17/00 | (2006.01) |
| G08B 25/01 | (2006.01) |
| G08B 25/10 | (2006.01) |
| H04W 64/00 | (2009.01) |

(52) U.S. Cl.
CPC ........... *G08B 17/00* (2013.01); *G08B 25/016* (2013.01); *G08B 25/10* (2013.01); *H04W 4/029* (2018.02); *H04W 4/33* (2018.02); *H04W 64/003* (2013.01)

(56) References Cited

U.S. PATENT DOCUMENTS

| | | | |
|---|---|---|---|
| 2014/0015667 A1 | 1/2014 | Kolb | |
| 2014/0266669 A1* | 9/2014 | Fadell | G08B 19/00 |
| | | | 340/501 |
| 2016/0148498 A1* | 5/2016 | Ruszala | G06F 3/04842 |
| | | | 340/506 |
| 2017/0142373 A1* | 5/2017 | Black | H04W 64/00 |
| 2017/0339574 A1* | 11/2017 | Zhang | H04B 7/088 |
| 2018/0316402 A1* | 11/2018 | Jalden | H04B 7/0617 |

OTHER PUBLICATIONS

International Preliminary Report on Patentability, dated Aug. 1, 2019, from International Application No. PCT/IB2017/050249, filed on Jan. 17, 2017. 10 pages.

* cited by examiner

LOCATION-AWARE PROVISIONING SYSTEM FOR FIRE ALARM SYSTEM AND METHOD THEREFOR

RELATED APPLICATIONS

This application is a § 371 National Phase Application of International Application No. PCT/IB2017/050249, filed on Jan. 17, 2017, now International Publication No. WO 2018/134640, published on Jul. 26, 2018, which is incorporated herein by reference in its entirety.

BACKGROUND OF THE INVENTION

Fire alarm systems are often installed within buildings such as commercial, residential, or governmental buildings. Examples of these buildings include offices, hospitals, warehouses, schools, shopping malls, government offices, and casinos.

The fire alarm systems typically include fire control panels (or control panels) that function as system controllers. Slave devices, including fire detection/initiation devices and alarm notification devices, are then installed throughout the buildings and connected to the panels. Some examples of fire detection/initiation devices include smoke detectors, heat detectors, carbon monoxide detectors, flame detectors, temperature sensors, call points and/or pull stations (also known as manual call points). Some examples of fire notification devices include audible notification devices such as speakers, horns, bells, chimes, and visual notification devices, such as light emitting diode (LED) reader boards, and/or flashing lights (e.g., strobes).

The fire detection devices monitor the buildings for indicators of fire. Upon detection of an indicator of fire such as smoke or heat or flames, the devices are activated and signals are sent from the activated devices to the control panel. The control panel then initiates an alarm condition by activating audio and visible alarms of the fire notification devices of the fire alarm system.

Some fire alarm systems use connected services systems to monitor control panels and slave devices. In these cases, the control panels communicate with the connected services systems often over a public network, for example. This has allowed the control panels to report status information to the connected services systems, which are typically administered by fire alarm system companies and include, for example, connected services servers for sending and receiving information to and from the control panels, and databases for storing historical status information.

Within fire alarm systems, the control panel monitors one, but often many, loops. Each loop includes a number of addressable slave devices connected to a common communication medium or bus via their respective wired ports. Fire alarm systems often include several loops, which can divide slave devices according to their location or function, among other examples. The slave devices need to have unique slave addresses so that the control panel can communicate with individual slave devices via the common communication medium.

Typically, the slave address for each slave device is selected during the design of fire alarm systems. Before the fire alarm system is installed, a design map is created that includes a map of the premises with the intended placement of the control panel and various loops (including the placement of specific slave devices). Within each loop, a unique slave address is then assigned to each slave device, and the slave addresses are indicated on the map.

The map is then used in the installation and configuration process that includes assigning the slave addresses to the slave units. A technician physically accesses each slave device, consults the map to determine the selected slave address for the slave device, and then programs the slave address into the slave device. These addresses are commonly programmed by setting dual in-line package (DIP) or rotary switches. In more recent systems, the slave address can be assigned using configuration software running on a laptop connected to the slave device. Both of these methods typically require the slave devices to be disconnected. Newer systems, however, allow slave addresses to be assigned to slave devices wirelessly via an optical communications link.

Additionally, systems for scanning, capturing and representing built environments in three-dimensional and two-dimensional drawings have been proposed. These technologies leverage LIDAR, handheld three-dimensional mapping tablet devices using structured light (for example, tablets using the Google Tango platform), and/or time of flight cameras. These systems can produce building information models (BIMs), for example, which are digital representations of physical and functional characteristics of environments that can be used and cross-referenced across multiple phases of a building's life-cycle, including design, construction, and facility maintenance.

Additionally, indoor location tracking technologies exist that allow the location of a mobile computing device, such as a tablet, smart phone or laptop, to locate itself (for example, on a map). One example is the Google Tango platform, which typically runs on tablet devices, and uses motion tracking and image information to determine the location of the device. Other systems based on Ultra Wide Band (UWB), WiFi, Bluetooth Low Energy or LiFi may also be used to compute the indoor location.

SUMMARY OF THE INVENTION

In many fire alarm systems, the number of slave devices to be programmed can number in the hundreds or more. The technician is required to consult the design map for each slave device and then program the appropriate slave address using DIP switches, inputting the slave address into configuration software, or programming the slave devices wirelessly. As a result, the commissioning process for slave devices in fire alarm systems can be cumbersome and time consuming.

In the present system, a connected services system uses location information from an indoor location tracking system in order to automate the process of determining the slave address to be assigned to a particular slave device. The slave device is then programmed with the slave address wirelessly (for example, via LiFi). A verification module then confirms that the correct slave address was programmed into the slave device.

First, a digital representation of the premises, e.g. a layout map, might be prepared during the layout design phase, indicating the physical location of the slave devices, including loop numbers and addresses to be assigned to each slave device. This layout map can be stored on the connected services system in a connected services database.

Next a technician might enter the premises carrying a mobile computing device (for example, a Google Tango tablet) and initialize the indoor location tracking application by selecting known geolocation markers (such as entrance/exits) and load previously learned indoor Area Description Files (ADF) corresponding to the indoor space. In some cases, the location server continuously updates the tablet application with its location as the technician moves throughout the premises. When the technician intends to program the address of a slave device, they proceed to the proximity of the slave device and point the tablet at the slave device. The location of the slave device is then determined by the location server. The location of the slave device is sent to the connected services system, which uses the layout map to identify the slave device and return the slave address assigned to the slave device on the layout map.

The mobile computing device might then assign the slave address obtained from the connected services system to the slave device. This can be done via LiFi communication channel wherein a highly directional communication path is established between the mobile computing device and the intended slave device such that there is no interference from the neighboring slave devices. Alternatively radio frequency communication technologies such as a Bluetooth communications link, incorporating a highly directional transmission path, might be used for communication between the mobile computing device and the slave device. When in active communication, the slave device might be provisioned with a visual indication (such as a flashing LED) which thus provides a visual cue to the technician so that they can verify that the slave device they intend to program is the one which is in active communication with the mobile computing device. In addition to the slave address, a verification number and location information of the slave device are also sent to the slave device and stored in nonvolatile memory, in one example.

The verification module can be used to verify the assignment of the slave address by querying the control panel of the fire alarm system. The control panel retrieves the verification number stored on the slave device and sends it back to the verification module. The verification number assigned to the slave device is then compared to the verification number retrieved from the slave device in order to confirm that the slave address was programmed correctly.

In general, according to one aspect, the invention features a method for assigning addresses to slave devices in a fire alarm system of a premises. A mobile computing device first determines the locations of the slave devices within the premises and sends the locations to a connected services system. The connected services system then uses the locations to generate addresses based on a map of the premises. The slave addresses are then assigned to the slave devices, and the assignment of the addresses to the slave devices is verified.

In embodiments, the mobile computing device determines the locations of the slave devices using motion tracking and/or image information gathered by the mobile computing device, using positioning nodes of the premises, or by reference to wireless signals from the slave devices.

The addresses can be assigned to the slave devices by the mobile computing device wirelessly via LiFi or BLE, among other examples.

The mobile computing device verifies the assignment of the addresses to the slave devices by providing verification numbers to the slave devices. The connected services system retrieves the verification numbers from the slave devices by instructing the control panel to poll the slave devices at the assigned addresses and obtain the provided verification numbers. The retrieved verification numbers are compared to the verification numbers provided to the slave devices by the mobile computing device.

A graphical user interface (GUI) can be displayed on a touch screen display of the mobile computing device. The GUI includes a map of the premises, icons representing the slave devices, and an indication of the current location of the mobile computing device.

In general, according to another aspect, the invention features a fire alarm provisioning system for assigning addresses to slave devices in a fire alarm system. The system includes a connected services system, which provides or generates the addresses of the slave devices based on locations of the slave devices and a map of the premises, and a mobile computing device, which determines the locations of the slave devices within a premises, sends the locations to the connected services system, and verifies assignment of the addresses to the slave devices.

In general, according to another aspect, the invention features a method for determining the location of slave devices in a fire alarm system of a premises. The location information for slave devices is first obtained. In addition, the slave devices wirelessly broadcast signals to a mobile computing device. The mobile computing device then determines its location with reference to the location information of the slave devices.

In general, according to another aspect, the invention features a location tracking system for determining the location of slave devices in a fire alarm system of a premises. The system includes slave devices and a mobile computing device. The slave devices wirelessly broadcast signals to the mobile computing device, which obtains location information for the slave devices and determines its location with reference to the location information of the slave devices.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1A:
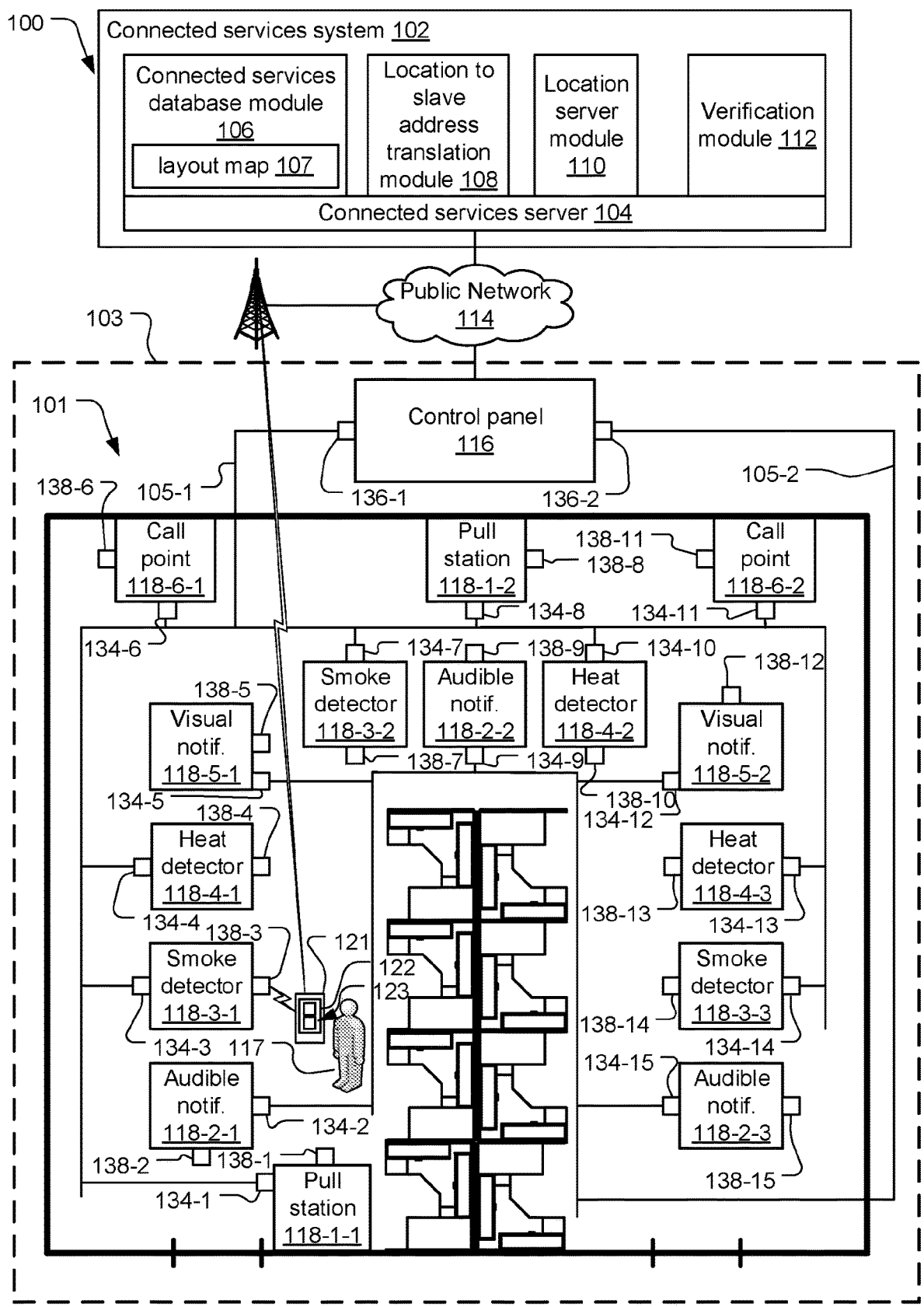
FIG. 1A is a schematic diagram of the preferred embodiment of a provisioning system for a fire alarm system, in which the indoor tracking system comprises a mobile computing device using motion tracking and image information to determine its location.

FIG. 1A is a schematic diagram of the preferred embodiment of a provisioning system 100 for a fire alarm system 101, which has been constructed according to the principles of the present invention.

As is typical, the fire alarm system 101 is installed within a premises 103 which can be a commercial, residential, or governmental building such as an office, hospital, warehouse, school, shopping mall, government office, or casino, to list a few specific examples.

The fire alarm system 101 includes a control panel 116 and various slave devices 118. The control panel functions as a system controller, directing the function of the fire alarm system 101 by determining and displaying the operational status of connected slave devices 118, receiving and sending alarm signals to and/or from the slave devices 118, and sending instructions to be executed by the slave devices 118.

The slave devices 118 include fire detection and fire initiation devices. In general, the fire detection devices monitor the premises 103 for indicators of fire. Upon detection of an indicator of fire such as smoke or heat or flames, the fire detection devices are activated. Smoke detectors 118-3 are activated upon detection of smoke, and heat detectors 118-4 are activated upon detection of heat or fire. On the other hand, the fire initiation devices, including pull stations 118-1 and call points 118-6, are activated by individuals within the premises 103 pushing a button or flipping a switch, for example. Upon activation, fire detection and fire initiation devices send alarm signals to the control panel 116. In the illustrated example, the fire alarm system 101 includes two pull stations 118-1, three smoke detectors 118-3, three heat detectors 118-4, and two call points 118-6.

Additionally, the slave devices 118 include audible notification devices 118-2, such as speakers, horns, bells, or chimes, and visual notification devices 118-5, such as light emitting diode (LED) reader boards or flashing lights (e.g. strobes). Upon receipt of alarm signals from one or more of the fire detection and fire initiation devices, the control panel 116 initiates an alarm condition by activating the audible notification devices 118-2 and the visual notification devices 118-5, which alert occupants of the premises 103 of the alarm condition. In the illustrated example, the fire alarm system 101 includes three audible notification devices 118-2 and two visual notification devices 118-5.

The slave devices 118 include wired slave ports 134, wireless slave ports 138, and nonvolatile memory. Each different type of slave device 118 also includes additional components pertaining to the specific function of each slave device.

The control panel 116 communicates with the slave devices 118 via a safety and security wired and/or wireless network (also known as a loop) 105, which is a common communication medium that supports data communication between the slave devices 118 and the control panel 116. The control panel 116 connects to the loop 105 via a wired control panel port 136. Similarly, slave devices 118 connect to the loop 105 via wired slave ports 134. In general, the wired ports 136, 134 provide an interface to cables for communication between the control panel 116 and the slave devices 118 via cables that form the loop 105.

In the illustrated example, the control panel 116 monitors two loops 105-1, 105-2, and the slave devices 118 installed on each loop 105 are divided according to their function. For example, all of the fire detection/initiation devices are installed on the first loop 105-1, while all of the fire notification devices are installed on the second loop 105-2. In other examples, the slave devices 118 can be divided among the loops according to other factors such as their location.

The control panel 116 often uses one common address space for each loop 105 to communicate with the slave devices 118. For each loop 105, each slave device 118 is assigned a unique slave address for its loop, and the control panel 116 uses the slave address to address instructions to slave devices 118 or to identify incoming information from slave devices 118.

Typically, the slave address for each slave device 118 is selected during the design of fire alarm systems. Before the fire alarm system 101 is installed, a design layout map 107 is created. The layout map 107 is a digital representation of the premises 103, such as a building information model (BIM), for example. The layout map 107 can be created from existing architecture drawings or model or by using technologies such as LIDAR, structured light and/or time of flight cameras to scan the premises 103. It can include visual depictions of the premises 103, such as two- or three-dimensional drawings, as well as raw location data representing the physical and functional characteristics of the premises 103. During the process of designing the fire alarm system 101, the intended positions of the control panel 116, loops 105 and slave devices 118 are indicated on the layout map 107. Within each loop 105, a unique slave address is then selected for each slave device 118, and the intended slave addresses are also indicated on the layout map 107.

In general, the layout map 107 is used in conjunction with a mobile computing device 121, an indoor tracking system and a connected services system 102 in order to automate the process of determining the intended slave address for each slave device 118, assigning the slave address to the slave device 118, and verifying the assignment of the slave address to the slave device 118.

Typically, the mobile computing device 121 is a tablet computer, but in other examples, it can be a laptop computer, smart phone, or phablet computer (i.e., a mobile device that is typically larger than a smart phone, but smaller than a tablet), to list a few. The mobile computing device includes a display 122, which, in the preferred embodiment, is a touchscreen display on which a graphical user interface (GUI) 123 is rendered by the computing device's controller or central processing unit.

In the illustrated example, the indoor tracking system is executing on the mobile computing device 121 and uses motion tracking and image information to determine the location of the mobile computing device 121. In one example, the indoor tracking system is Google Tango. Tango integrates motion tracking, depth perception and area learning functionalities. The motion tracking functionality uses image information captured by the mobile computing device 121 to detect and recognize visual features of the environment such as doors, and data detected by an accelerometer and a gyroscope, in order to track the movement of the mobile computing device 121. The depth perception functionality uses image information to detect distances, sizes and surfaces in the environment. The area learning functionality includes storing information detected about the environment in maps that can be enhanced, annotated and re-used, among other examples. These maps are stored in Area Description Files (ADF).

The connected services system 102 includes a connected services server 104, a connected services database module 106, a location to slave address translation module 108, a location server module 110, and a verification module 112. In the illustrated embodiment, the various modules are processes running on the connected services server 104. In an alternative embodiment, the modules are processes running on one or more different servers. In yet another embodiment, the modules are separate devices communicating with the connected services server 104.

In general, the connected services server 104 receives information from the control panel 116 of the fire alarm system 101 and the mobile computing device 121 typically via a public network 114, which is a wide area network such as the internet, or dedicated data link or even a POTS connection and forwards the information to the various modules or stores the information in the connected services database 106. The connected services server 104 also sends instructions to be executed by the control panel 116.

In addition to storing information received from the fire alarm system 101, the connected services database stores the layout map 107.

The location server module 110 continuously receives the current location of the mobile computing device 121 (in a format pertaining to the indoor tracking system), calculates the location of the mobile computing device 121 with regard to the layout map 107, and sends location information (in a format pertaining to the layout map 107) to the mobile computing device 121. In one embodiment, the location server module 110 is provisioned as a remote server, for example, as part of the connected services system 102. In another embodiment, the location server module 110 is executing on the mobile computing device 121. In this way, the location server module 110 continuously updates the mobile computing device 121 with its location while a technician 117 completing the provisioning process for the fire alarm system 101 proceeds throughout the premises 103 holding the mobile computing device 121.

The location to slave address translation module 108 receives location information from the mobile computing device 121, maps the location information to the corresponding slave device 118 using the layout map 107, and sends the intended slave address of the corresponding slave device 118 back to the mobile computing device 121. In order to determine the location of a slave device 118, the technician 117 points the mobile computing device 121 at the slave device 118.

The intended slave address is wirelessly assigned by the mobile computing device 121 to the slave device 118 via the wireless slave port 138, which is a wireless interface using radio and/or optical communication technology such as WiFi, LiFi, Bluetooth, and Bluetooth Low Energy, among other examples. However, the address assignment could take place through a wired connection, such as USB. The slave address is stored in the non-volatile memory of the slave device 118.

For reference, WiFi stands for wireless fidelity. Its protocols implement the IEEE 802.11 standards. LiFi or Li-Fi stands for Light Fidelity. It is a bidirectional, high-speed and optical communication technology that is also based on the 802.11 protocols. BLE stands for Bluetooth low energy, which is a low power version of the Bluetooth standard.

The verification module 112 receives location information associated with a slave device from the mobile computing device 121 and verifies that the intended slave address has been correctly assigned to the slave device.

In the illustrated example, the technician 117 is standing near the smoke detector 118-3-1 holding the mobile computing device 121. The mobile computing device 121 is wirelessly communicating with the smoke detector 118-3-1 via the wireless slave port 138-3. Additionally, the mobile computing device 121 is wirelessly communicating with the connected services server 104 via a cellular connection to the public network 114.

Figure 1B:
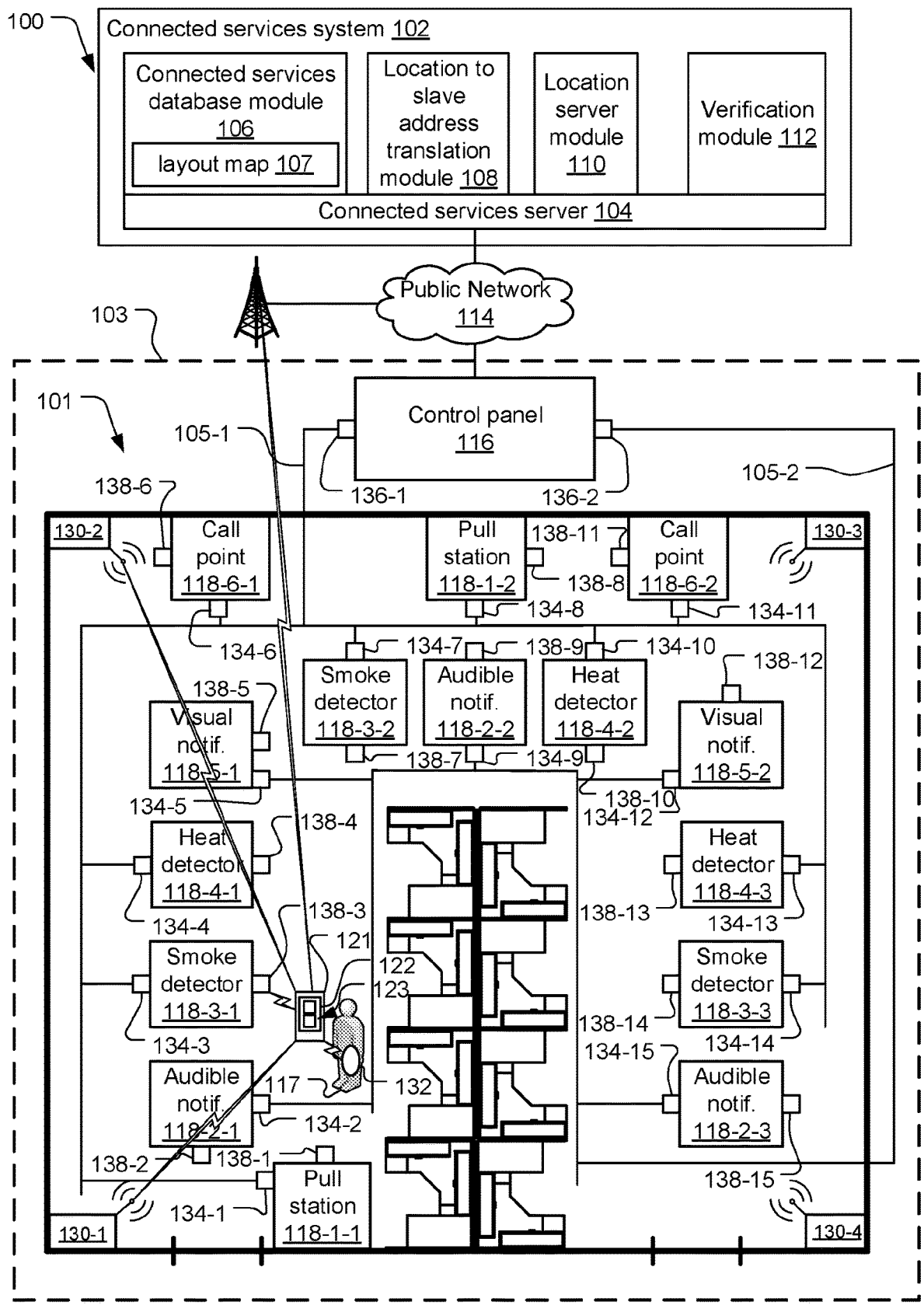
FIG. 1B is a schematic diagram of an alternative embodiment of the provisioning system, in which the indoor tracking system comprises a series of positioning nodes and a mobile tag.

FIG. 1B is a schematic diagram of the provisioning system 100 according to an alternative embodiment. In this embodiment, the indoor tracking system comprises a series of positioning nodes 130 and a mobile tag 132. The positioning nodes 130, which can either be a permanent part of the premises 103 or temporarily stationed around the premises 103, broadcast wireless signals to the mobile computing device 121. Additionally, the mobile tag 132, which can be attached to or otherwise carried by the technician 117, broadcasts wireless signals to the mobile computing device 121. The wireless signals can be transmitted using ultra-wideband (UWB), WiFi, LiFi, or BLE technologies, among other examples. The location of the mobile computing device 121 is calculated based on the signal strength and/or time of flight of the wireless signals, among other methods.

In the illustrated example, the technician 117 is standing near the smoke detector 118-3-1 holding the mobile computing device 121. The mobile computing device 121 is wirelessly communicating with the smoke detector 118-3-1 via the wireless slave port 138-3 and with the connected services server 104 via a cellular connection to the public network 114. Additionally, the mobile computing device 121 is receiving wireless signals from two positioning nodes 130-1, 130-2 and from the mobile tag 132.

Figure 1C:
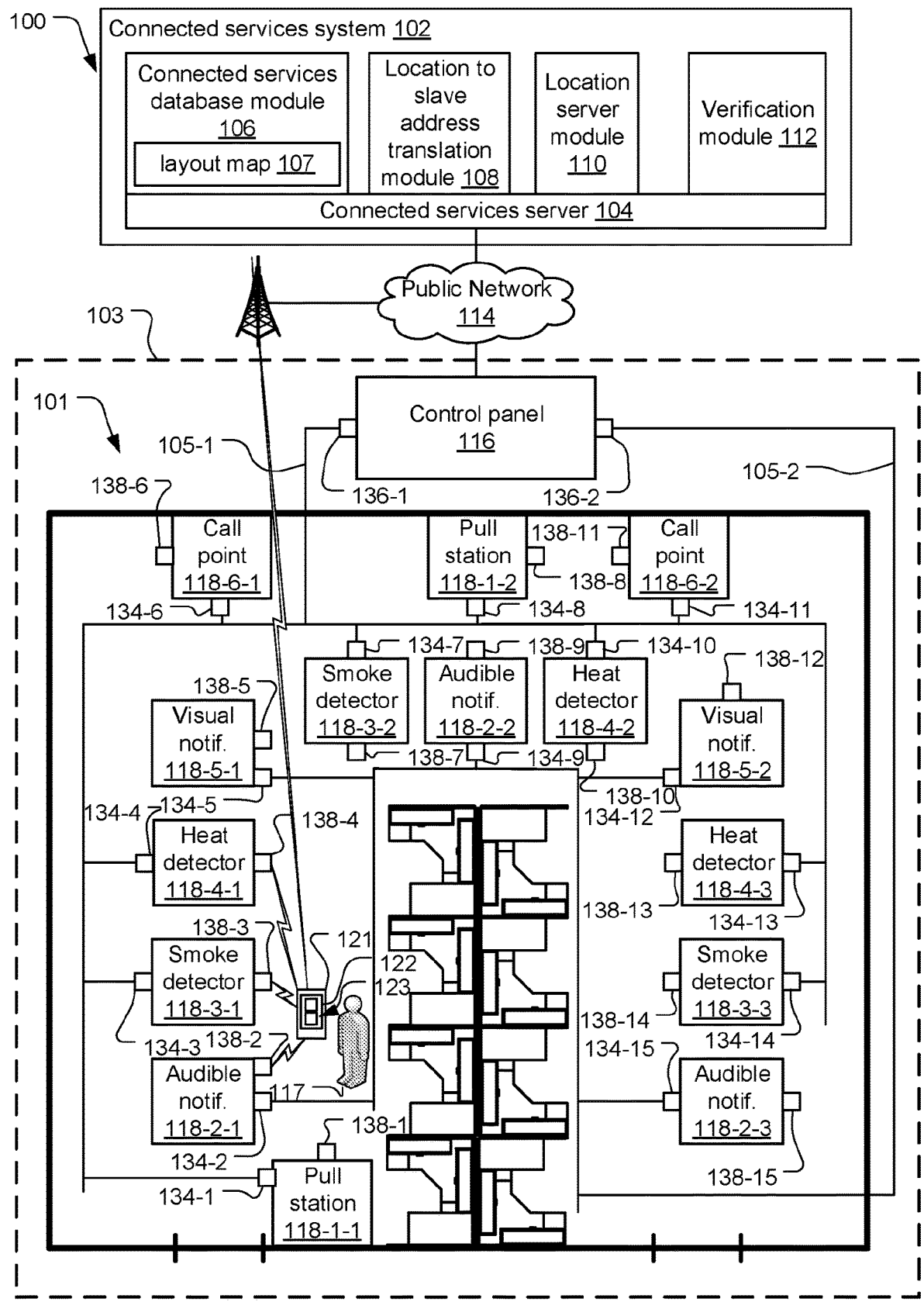
FIG. 1C is a schematic diagram of an alternative embodiment of the provisioning system in which the indoor tracking system uses wireless signals broadcast by the slave devices to determine its location.

FIG. 1C is a schematic diagram of the provisioning system 100 according to an alternative embodiment. In this embodiment, the indoor tracking system uses wireless signals broadcast by the slave devices 118. Slave devices 118, for which location information has been obtained, broadcast wireless signals to the mobile computing device 121. The location of the mobile computing device 121 is then calculated based on the location information of the slave devices 118 and the wireless signals received from the slave devices 118.

In the illustrated example, the technician 117 is standing near the smoke detector 118-3-1 holding the mobile computing device 121. The mobile computing device 121 is wirelessly communicating with the smoke detector 118-3-1 via the wireless slave port 138-3 and with the connected services server 104 via a cellular connection to the public network 114. Additionally, the mobile computing device 121 is receiving wireless signals from an audible notification device 118-2-1, a smoke detector 118-3-1, and a heat detector 118-4-1.

Figure 2A:
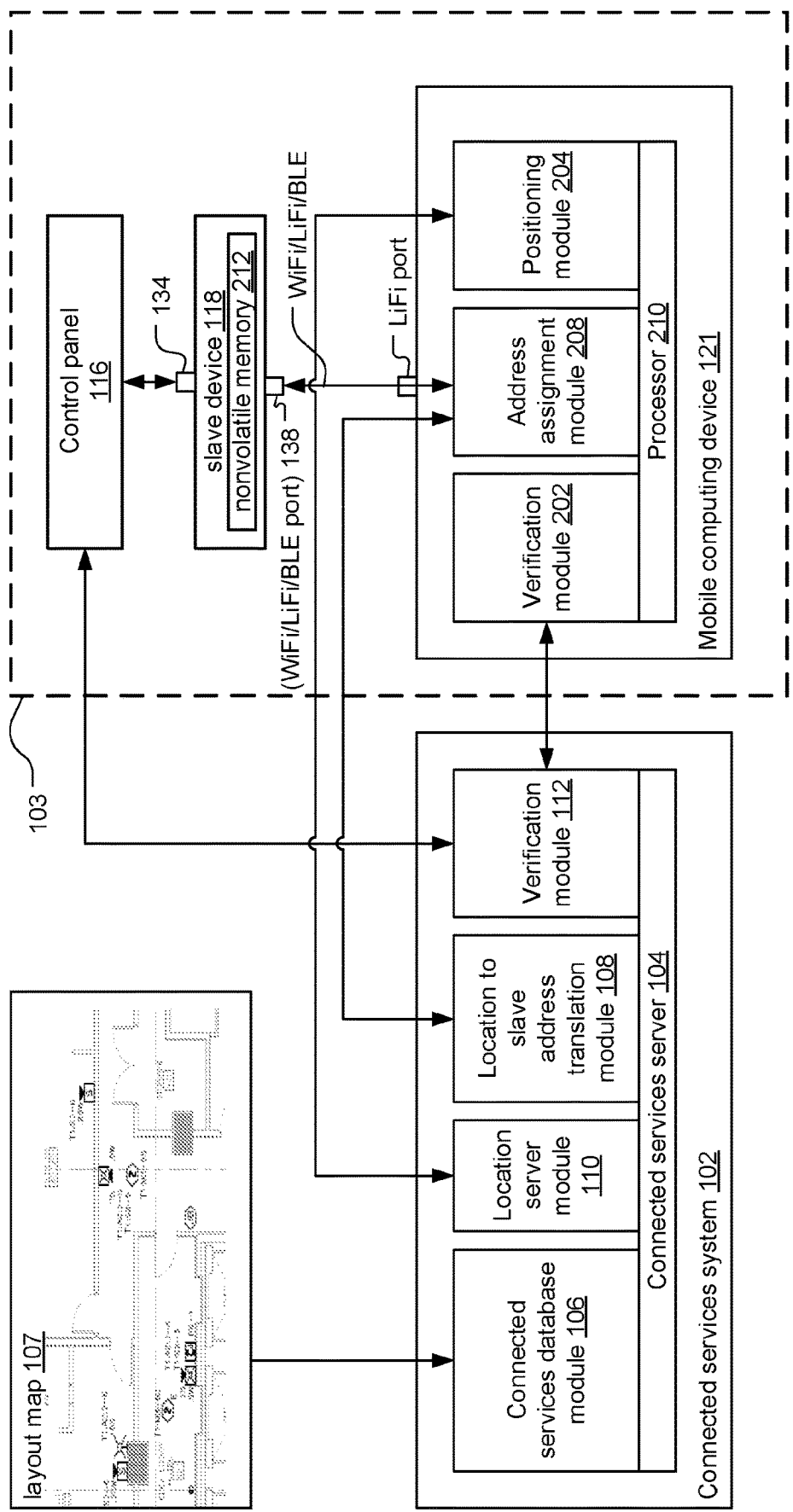
FIG. 2A is a block diagram showing how the connected services system communicates with the fire alarm system and the mobile computing device during the provisioning process, according to the preferred embodiment.

FIG. 2A is a block diagram showing how the connected services system 102 communicates with the fire alarm system 101 and the mobile computing device 121 during the provisioning process, according to the preferred embodiment. In the illustrated embodiment, the mobile computing device 121 is a Google Tango tablet.

The mobile computing device 121 includes a processor 210, a verification module 202, an address assignment module 208 and a positioning module 204. The processor 210 directs the function of the mobile computing device 121. The positioning module 204 manages the indoor tracking functionality of the mobile computing device 121. As such, it determines the current position of the mobile computing device 121 in a format related to the indoor tracking system. The positioning module 204 also communicates with the location server module 110 to obtain location information in a format associated with the layout map 107 for the mobile computing device 121. The address assignment module 208 communicates with the location to slave address translation module 108 of the connected services system 102 to retrieve the intended slave address for the slave device 118. Additionally, the address assignment module 208 communicates with the slave device 118 to assign the slave address to the slave device 118. The verification module 202 of the mobile computing device 121 communicates with the verification module 112 of the connected services system 102 in order to verify that the slave address has been correctly assigned to the slave device 118. In the illustrated embodiment, the verification module 202, address assignment module 208, and the positioning module 204 are processes running on the processor 210 of the mobile computing device 121. In alternative embodiments, the modules can also be processes running on remote servers or separate devices communicating with the mobile computing device 121.

First, the layout map 107, on which the locations and intended slave addresses of all of the slave devices 118 of the fire alarm system 101 are indicated, is stored in the connected services database module 106.

On a continuous basis, the positioning module 204 determines the current location of the mobile computing device 121 using motion tracking and image information and sends that location to the location server module 110, which translates it to a position on the layout map 107, returning the translated location information back to the positioning module 204. This location information is continuously updated, tracking the location of technician 117 as they move throughout the premises 103 holding the mobile computing device 121. The location information received from the location server module 110 is displayed in real time, for example, on a map displayed on a touch screen display of the mobile computing device 121. The location information can also include additional information from the layout map 107, such as the location of nearby slave devices 118 and other features of the premises 103, which can also be displayed in addition to the current location of the mobile computing device 121.

When the technician 117 intends to program the slave address of a slave device 118, the technician 117 points an optical data port (LiFi), for example, of the mobile computing device 121 at the slave device 118. The current location information (received from the location server module 110) is sent by the address assignment module 208 to the location to slave address translation module 108, which maps the location information to the position of the slave device 118 indicated on the layout map 107 and retrieves the intended slave address for the slave device 118, which is returned to the address assignment module 208.

The address assignment module 208 sends the slave address to the slave device 118 via the wireless slave port 138 using WiFi, LiFi or BLE, and the slave address is saved in nonvolatile memory 212 of the slave device 118, along with location information for the slave device 118 and a verification number, which is a unique number generated by the address assignment module 208 and used to verify the correct assignment of the slave addresses to the slave devices 118. After the slave address is assigned to the slave device 118, the slave device 118 sends an acknowledgment back to the address assignment module 208 of the mobile computing device 121.

The verification module 202 of the mobile computing device 121 then sends a request to the verification module 112 of the connected services system 102 to verify that the slave address was assigned correctly. The request includes the current location information of the mobile computing device 121 (and thus the location of the slave device 118 being verified). The verification module 112 of the connected services system 102 retrieves the loop identification and the intended slave address for the slave device 118 at that location, according to the layout map 107, and then sends instructions to the control panel 116 of the fire alarm system 101 to retrieve the verification number saved on slave device 118 at the retrieved slave address on the loop associated with the retrieved loop information. The control panel 116 returns the verification number retrieved from the slave device 118 to the verification module 112 of the connected services system 102. The retrieved verification number is sent to the verification module 202 of the mobile computing device 121, and the mobile computing device 121 compares the retrieved verification number to the verification number originally assigned to the slave device 118. In an alternative embodiment, the verification module 112 of the connected services system 102 performs the comparison and returns the results of the comparison to the verification module 202 of the mobile computing device 121.

Figure 2B:
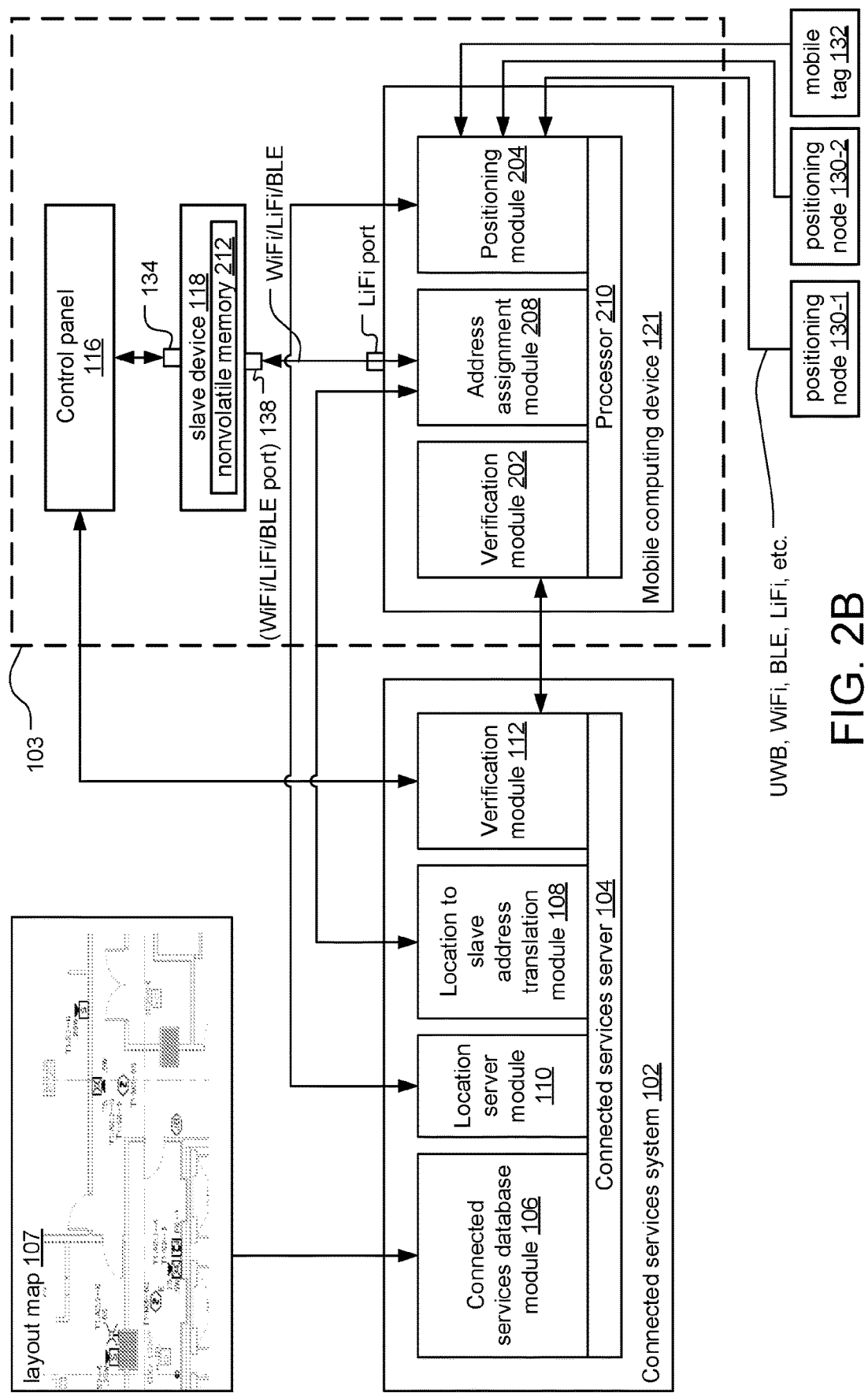
FIG. 2B is a block diagram showing how the connected services system communicates with the fire alarm system and the mobile computing device during the provisioning process, according to an alternative embodiment.

FIG. 2B is a block diagram showing how the connected services system 102 communicates with the fire alarm system 101 and the mobile computing device 121 during the provisioning process, according to an alternative embodiment in which the indoor tracking system comprises positioning nodes 130 and a mobile tag 132. In this example, instead of using motion tracking and image information to determine the location of the mobile computing device 121, the positioning module 204 receives wireless signals from the positioning nodes 130 and mobile tag 132 via UWB, WiFi, BLE and/or LiFi. The location of the mobile computing device 121 is then determined based on the signal strength and time of flight of the signals, among other methods.

Figure 2C:
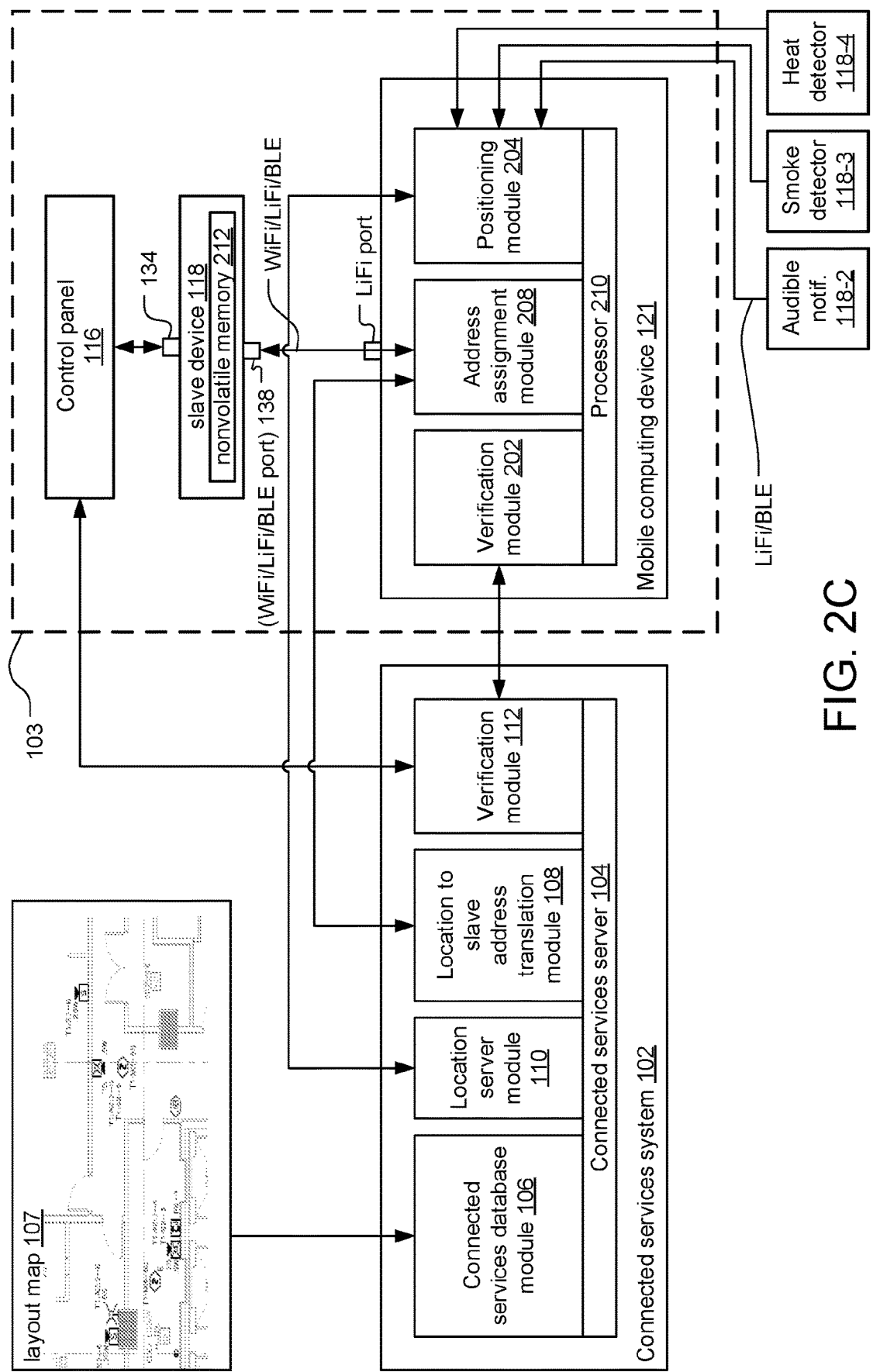
FIG. 2C is a block diagram showing how the connected services system communicates with the fire alarm system and the mobile computing device during the provisioning process, according to an another embodiment.

FIG. 2C is a block diagram showing how the connected services system 102 communicates with the fire alarm system 101 and the mobile computing device 121 during the provisioning process, according to an alternative embodiment in which the indoor tracking system comprises slave devices 118 broadcasting wireless signals to the mobile computing device 121. In this example, the positioning module 204 receives signals from an audible notification device 118-2, a smoke detector 118-3 and a heat detector 118-4 via LiFi and/or BLE. Location information for each of the slave devices 118 is obtained. The positioning module 204 determines the location of the mobile computing device 121 based on the location information for the slave devices 118 and the wireless signals received by the slave devices 118.

During the provisioning process, it is important that the communication channel between the slave device 118 and mobile computing device 121 is highly directional in nature. LiFi technology, being visible light or other optical communication (line of sight), lends itself for this purpose. It is much more practical to control the directionality of the LiFi communication as compared to the radio frequency (RF) technologies (BLE or WiFi) and hence mitigate the issue of inconsistent programming (such as a nearby unintended slave device 118 being provisioned instead of the intended slave device 118). In addition, it is also important for the technician 117 to be able to confirm during the process that the mobile computing device 121 is communicating with the intended slave device 118 and not a nearby device during the provisioning process.

Figure 3:
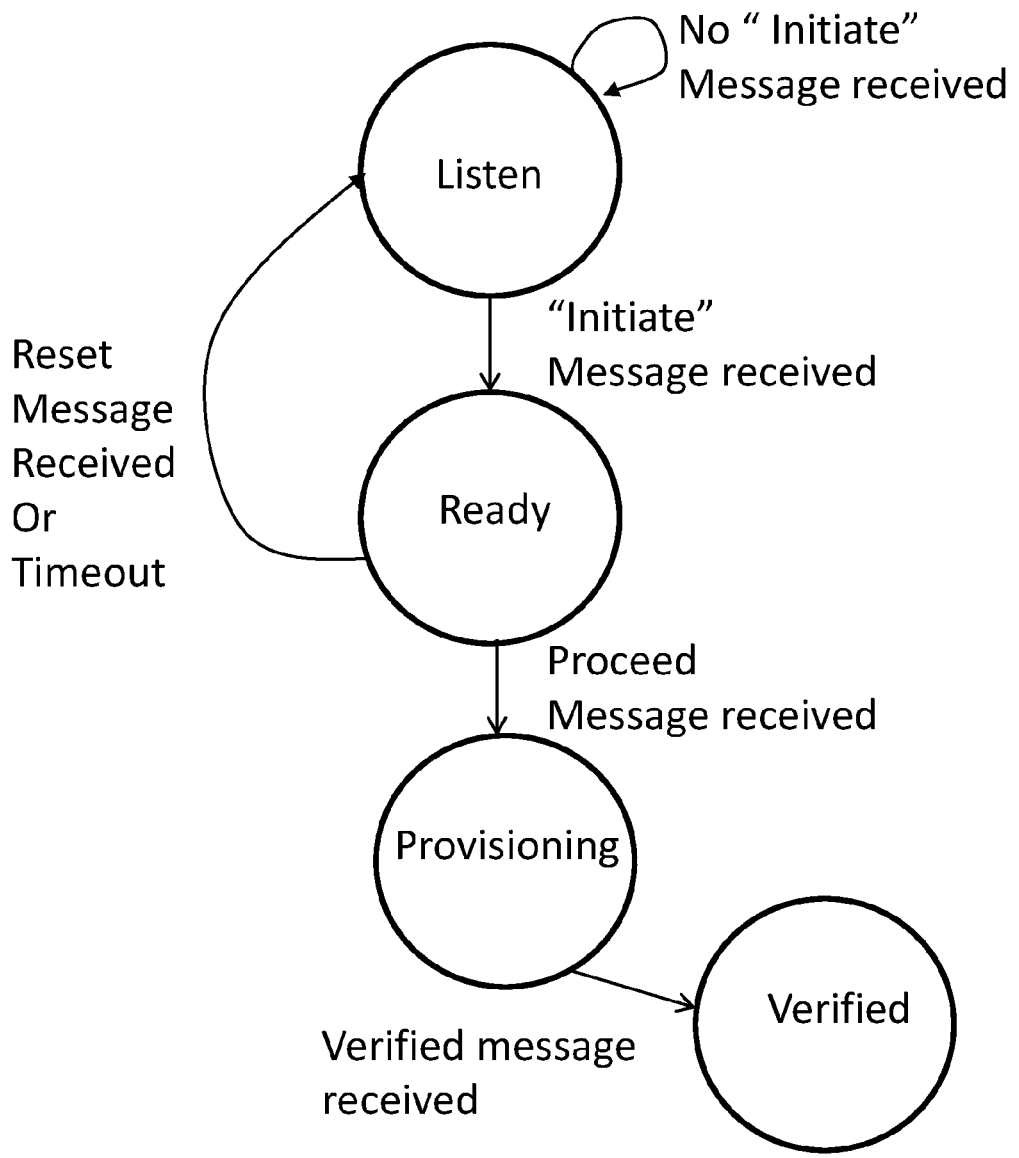
FIG. 3 is a state diagram illustrating possible states of the slave devices during the provisioning process.

FIG. 3 is a state diagram illustrating the possible states of the slave devices 118 during the process by which the mobile computing device 121 assigns the slave address to the slave device 118.

As previously discussed, when the technician 117 intends to program the slave address of a slave device 118, the technician 117 positions themselves as close as possible to the intended slave device 118. The technician 117 then points an optical data port (LiFi), for example, of the mobile computing device 121 at the slave device 118 in order to establish a communication path.

As illustrated, initially, all the slave devices 118 will be in a "listening" state until an "initiate" protocol message is received from the mobile computing device 121, following which the slave device 118 responds with a protocol message including a slave device type identifier and transitions to a "ready" state. The mobile computing device 121 displays on the GUI 123 all of the device type identifiers received, including those received from the intended slave device 118 and those received from nearby slave devices. The technician 117 selects the intended device type, and an "activation" protocol message is sent to the slave device 118.

Upon receiving the activation message, the slave device 118 outputs a visual indication (blinking LEDs), in one example. The technician 117 verifies that the visual indication is activated on the intended slave device 118 and then confirms the selection on the GUI 123. As a result, a "proceed" protocol message is sent by the mobile computing devices, and the slave device 118 transitions to a "provisioning state", following which the slave device 118 can be programmed with the slave address.

The mobile computing device 121 transmits a "reset" message to the slave devices 118 which are not selected. Either upon receipt of the "reset" message, or after a predetermined period of time, the slave devices 118 return to the "listening" state.

If the technician 117 determines that the slave device 118 which has been activated is not the intended slave device 118 then they may cancel the selected device, and as a result, a "reset" protocol message is sent to the selected slave device 118, which returns to the "listening" state and deactivates the visual indication. At that point, the technician may move closer to the intended slave device 118 and reselect the intended slave device 118 to program the slave address.

The current location information (received from the location server module 110) is sent by the address assignment module 208 to the slave address translation module 108, which maps the location information to the position of the slave device 118 indicated on the layout map 107 and retrieves the intended slave address for the slave device 118, which is returned to the address assignment module 208. On successful verification by the verification modules 112, 202, a "verified" protocol message is sent to the slave device 118, after which the slave device 118 transitions into a "verified state".

Figure 4:
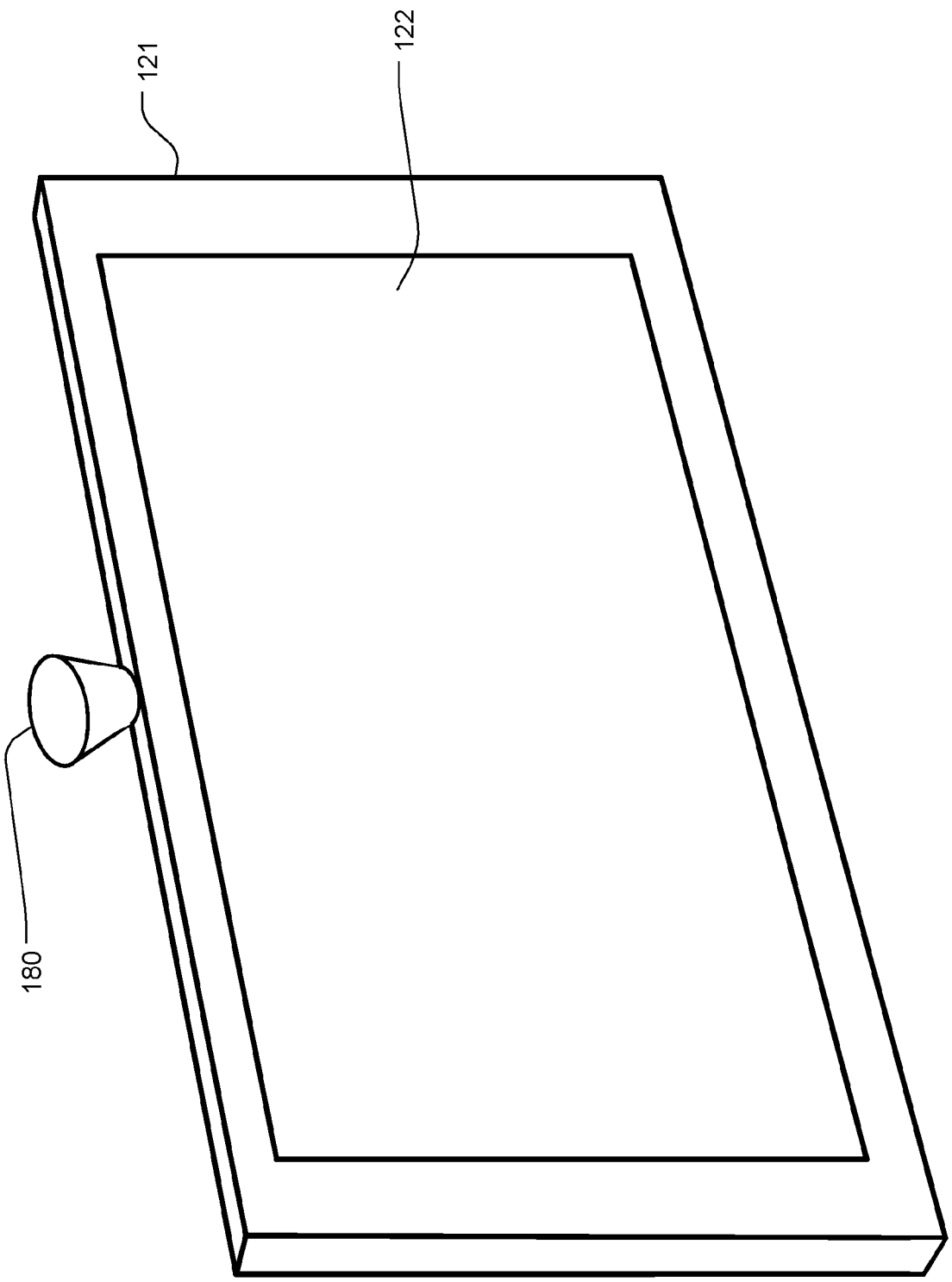
FIG. 4 is an illustration of a directionality module attached to the wireless port of the mobile computing device, according to one embodiment of the present invention.

In addition, a physical construction can further enhance the directionality of the wireless port such that only the intended slave device 118 would be able to receive the wireless transmissions. FIG. 4 is an illustration of a directionality module 180 attached to the wireless port of the mobile computing device 121, according to one embodiment of the present invention.

In the illustrated embodiment, the directionality module 180 is a conical structure attached to the wireless port of the mobile computing device 121, which narrows the antenna or optical port transmission and reception aperture. This directs wireless transmissions to and from the intended slave device 118 by blocking the line of sight between the wireless port of the mobile computing device 121 and any other nearby slave devices 118 except for the intended slave device 118.

Figure 5:
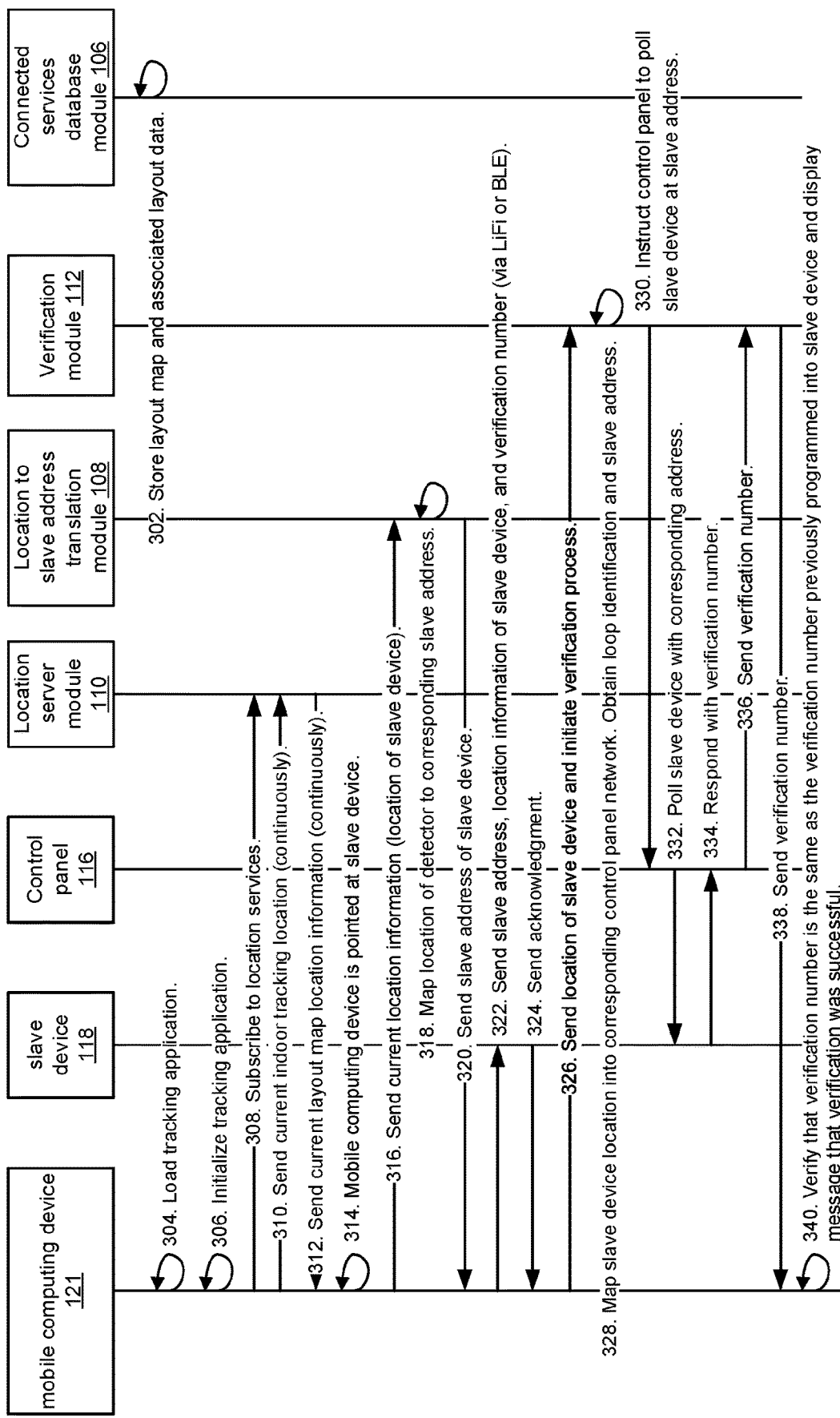
FIG. 5 is a sequence diagram showing the method for assigning slave addresses to the slave devices of the fire alarm system.

FIG. 5 is a sequence diagram showing the method for assigning addresses to the slave devices 118 of the fire alarm system 101.

First, in step 302, the layout map 107 is stored in the connected services database module 106.

Then, in step 304, the technician 117 loads a tracking application on the mobile computing device 121. The tracking application can direct the functionalities of the positioning module 204, address assignment module 208, and verification module 202 of the mobile computing device 121, or, alternatively, the tracking application can simply determine the current location and send the location to the other modules. The tracking application displays a graphical user interface on a touch screen display of the mobile computing device 121, including a map of the premises 103, icons representing the slave devices 118, an indication of the current location of the mobile computing device 121, and an interface allowing the technician 117 to select slave devices 118 and initiate the process of retrieving the intended slave address, assigning the retrieved slave address to the selected slave devices 118, and initiate the verification process.

In step 306, the tracking application is initialized. In the embodiment, in which a Google Tango table is used, the initialization involves loading previously learned Area Description Files corresponding to the premises 103 and selecting known geolocation markers (such as entrances and exits) in order to specify the starting location of the mobile computing device 121 in relation to the area mapped by the Area Description Files.

In step 308, the mobile computing device 121 subscribes to location services by sending a request to the location server module 110. Location services is the process by which the location of the mobile computing device 121 is translated to a location on the layout map 107 and displayed on the mobile computing device 121. The mobile computing device 121 continuously sends its current location (in a format related to the indoor tracking system) to the location server module 110 in step 310, which the location server module 110 continuously translates into location information (in a format related to the layout map 107). The location information is sent back to the mobile computing device in step 312.

When the technician intends to program the slave device 118, in step 314, they point the mobile computing device 121 at the slave device 118. In step 316, the current location information received from the location server module 110 is sent to the location to slave address translation module 108. In step 318, the location to slave address translation module 108 maps the current location information (which corresponds to the location of the slave device 118) to the position of the slave device 118 indicated on the layout map 107. The corresponding intended slave address is retrieved from the layout map 107, and, in step 320, the intended slave address is sent to the mobile computing device 121.

In step 322, the slave address, location information of the slave device 118, and a verification number are sent to the slave device 118 via LiFi or BLE, and the slave device 118 saves the information in nonvolatile memory 212. In response, an acknowledgment is sent back to the mobile computing device 121 from the slave device 118 in step 324.

The verification process is initiated in step 326, when the mobile computing device 121 sends the location information of the slave device 118 to the verification module 112 of the connected services system 102. In step 328, the verification module 112 maps the slave device 118 location information to the corresponding control panel network indicated on the layout map 107. The loop identification and intended slave address are retrieved. In step 330, the verification module 112 instructs the control panel 116 to poll the slave device 118 at the provided slave address, and in step 332, the control panel 116 polls the slave device 118, which sends its stored verification number back to the control panel 116 in step 334. The retrieved verification number is sent back to the verification module 112 in step 336, and in step 338, the verification number is sent back to the mobile computing device. Finally, in step 340, the retrieved verification number is compared with the previously programmed verification number, and, if they match, a message is displayed that the verification is successful.

Figure 6:
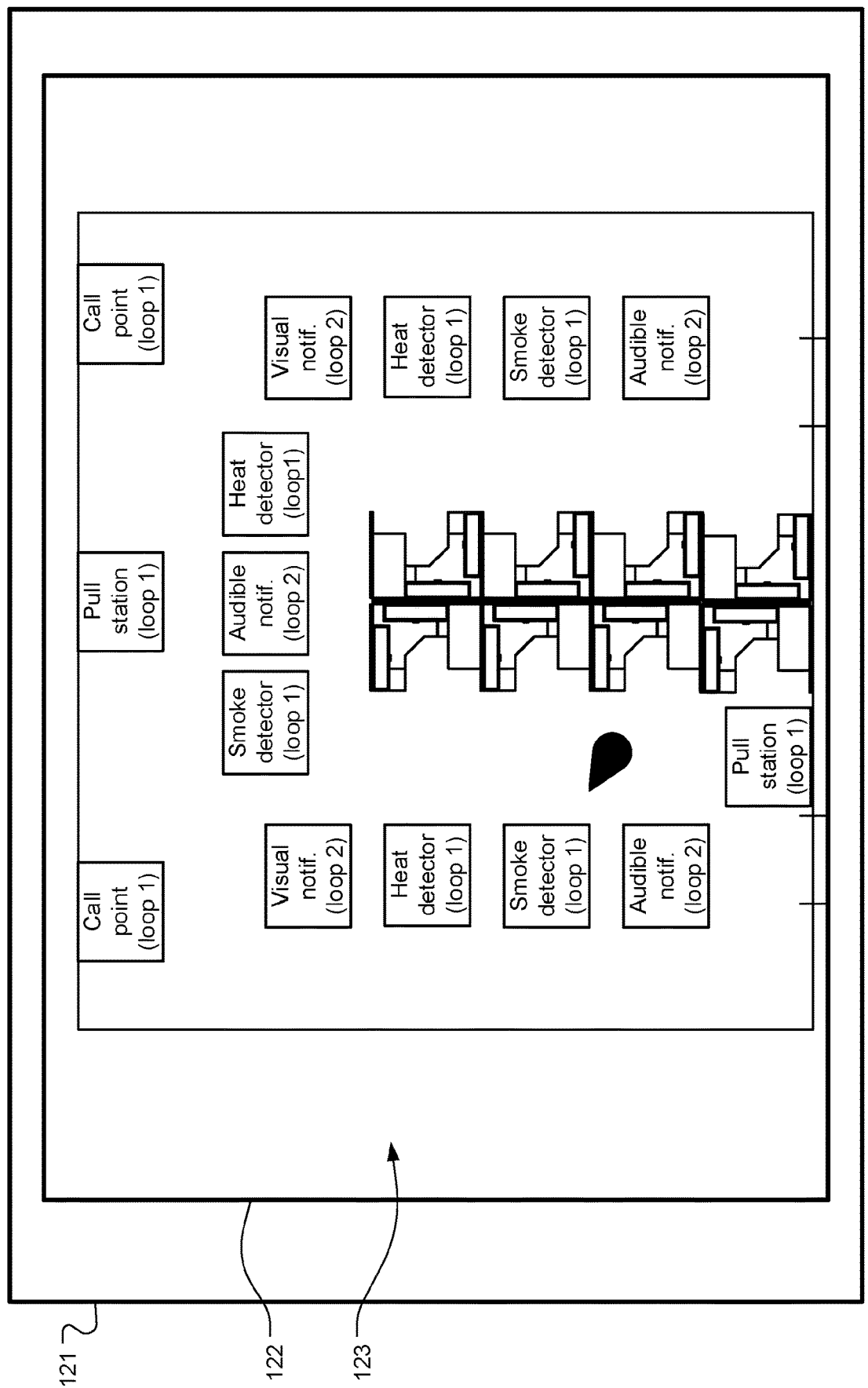
FIG. 6 illustrates an example of a graphical user interface (GUI) displayed on a touch screen display of the mobile computing device.

FIG. 6 illustrates an example of the graphical user interface (GUI) 123 displayed on the touch screen display 122 of the mobile computing device 121. The GUI 123 includes a map of the premises 103 with icons representing the slave devices 118, and an icon indicating the current location of the mobile computing device 121. Additionally, the loop 105 of each slave device 118 is indicated.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for assigning addresses to slave devices in a fire alarm system of a premises, the method comprising:
    a mobile computing device determining locations of the slave devices within the premises and sending the locations to a connected services system;
    the connected services system using the locations to generate addresses based on a map of the premises, wherein the map of the premises is a digital representation of the premises prepared during a layout design phase of the fire alarm system, the map indicating physical locations of the slave devices and addresses to be assigned to each slave device;
    assigning the addresses to the slave devices;
    verifying assignment of the addresses to the slave devices;
    wherein the mobile computing device displays a graphical user interface on a touch screen display of the mobile computing device, wherein the graphical user interface includes a map of the premises, icons representing the slave devices, and an indication of the current location of the mobile computing device.

2. The method according to claim 1, wherein the mobile computing device determines the locations of slave devices using motion tracking and/or image information gathered by the mobile computing device.

3. The method according to claim 1, wherein the mobile computing device determines the locations of the slave devices using positioning nodes of the premises.

4. The method according to claim 1, wherein the mobile computing device determines the locations of the slave devices by reference to wireless signals from the slave devices.

5. The method according to claim 1, wherein the addresses are assigned to the slave devices by the mobile computing devices via LiFi or BLE.

6. The method according to claim 1, wherein the mobile computing device verifies assignment of the addresses to the slave devices by providing verification numbers to the slave devices.

7. The method according to claim 6, wherein the assignments of the addresses are verified by the connected services system retrieving the verification numbers from the slave devices, and wherein the retrieved verification numbers are compared to the provided verification numbers.

8. The method according to claim 7, wherein the connected services system retrieves the verification numbers by instructing a control panel, which is a master for the slave devices, to poll the slave devices at the assigned addresses and obtain the provided verification numbers.

9. The method according to claim 7, wherein the mobile computing device compares the verification numbers provided to the slave devices with the verification numbers retrieved from the slave devices by the connected services system.

10. A fire alarm provisioning system for assigning addresses to slave devices in a fire alarm system, comprising
    a connected services system generating the addresses of the slave devices based on locations of the slave devices and a map of the premises; and
    a mobile computing device determining the locations of the slave devices within a premises and sending the locations to the connected services system, and verifying assignment of the addresses to the slave devices; and
    wherein the mobile computing device displays a graphical user interface on a touch screen display of the mobile computing device, wherein the graphical user interface includes a map of the premises, icons representing the slave devices, and an indication of the current location of the mobile computing device.

11. The system according to claim 10, wherein the mobile computing device determines the locations of slave devices using motion tracking and/or image information gathered by the mobile computing device.

12. The system according to claim 10, wherein the mobile computing device determines the locations of the slave devices using positioning nodes of the premises.

13. The system according to claim 10, wherein the mobile computing device determines the locations of the slave devices by reference to wireless signals from the slave devices.

14. The system according to claim 10, wherein the addresses are assigned to the slave devices by the mobile computing devices via LiFi or BLE.

15. The system according to claim 10, wherein the mobile computing device verifies assignment of the addresses to the slave devices by providing verification numbers to the slave devices.

16. The system according to claim 15, wherein the assignments of the addresses are verified by the connected services system retrieving the verification numbers from the slave devices, and wherein the retrieved verification numbers are compared to the provided verification numbers.

17. The system according to claim 16, wherein the connected services system retrieves the verification numbers by instructing a control panel, which is a master for the slave devices, to poll the slave devices at the assigned addresses and obtain the provided verification numbers.

18. The system according to claim 16, wherein the mobile computing device compares the verification numbers provided to the slave devices with the verification numbers retrieved from the slave devices by the connected services system.

19. The method according to claim 1, wherein the map of the premises includes visual depictions of the premises and raw location data representing physical and functional characteristics of the premises.

20. The method according to claim 1, wherein the map of the premises indicates intended positions of a control panel, loops, and the slave devices and, within each loop, a unique slave address for each slave device.

21. The method according to claim 1, wherein the mobile computing device determining the locations of the slave devices comprises continuously sending the current location of the mobile computing device in a format pertaining to an indoor tracking system to the connected services system, which returns location information for the mobile computing device in a format pertaining to the map of the premises.

22. The method according to claim 21, wherein the connected services system using the locations to generate addresses based on the map of the premises comprises receiving the location information from the mobile computing device, mapping the location information to a corresponding slave device using the map of the premises, and returning an intended address of the corresponding slave device indicated on the map of the premises.

23. The method according to claim 1, wherein the mobile computing device executes an indoor tracking system that tracks movement of the mobile computing device based on detecting and recognizing visual features of the premises in image information captured by the mobile computing device and based on data from an accelerometer and gyroscope of the mobile computing device, the mobile computing device detects distances, sizes, and surfaces in the premises based on the captured image information, and learns areas of the premises by storing the information detected about the premises in maps.

24. A method for assigning addresses to slave devices in a fire alarm system of a premises, the method comprising:
a mobile computing device determining locations of the slave devices within the premises and sending the locations to a connected services system;
the connected services system using the locations to generate addresses based on a map of the premises;
assigning the addresses to the slave devices; and
verifying assignment of the addresses to the slave devices, wherein:
initially, all of the slave devices are in a listening state until an initiate protocol message is received from the mobile computing device, following which the slave devices respond with a protocol message including a slave device type identifier and transitions to a ready state;
the mobile computing device displays all of the device type identifiers received, including those received from the intended slave device and those received from nearby slave devices and sends an activation protocol message to a slave device in response to selection of the slave device by a technician;
upon receiving the activation message, the slave device outputs a visual indication to be verified by the technician as the intended slave device; and
in response to confirmation of the selection by the technician, a proceed protocol message is sent by the mobile computing device, and the slave device transitions to a provisioning state, following which the slave device is programmed with the slave address.

25. The method according to claim 1, further comprising a directionality module attached to a wireless port of the mobile computing device enhancing directionality of the wireless port such that only intended slave devices receive wireless transmissions from the mobile computing device.

26. The method according to claim 25, wherein the directionality module narrows an antenna or optical port transmission and reception aperture of the wireless port of the mobile computing device by blocking line of sight between the wireless port of the mobile computing device and any other nearby slave devices except for an intended slave device.

27. The system of claim 10, further comprising a directionality module for enhancing directionality of a wireless port of the mobile computing device such that only intended slave devices receive wireless transmissions from the mobile computing device, wherein the wireless port is an optical data port, and the directionality module is a structure attached to the optical data port that narrows a transmission and reception aperture of the optical data port by blocking line of sight between the optical data port and any other nearby slave devices except for an intended slave device.

* * * * *